_United States Patent_ [19]

Davidson, Jr. et al.

[11] 3,897,215

[45] July 29, 1975

[54] CONVERTING MUNICIPAL REFUSE INTO COMPOST

[75] Inventors: William Davidson, Jr., Fairfield; Charles H. Kauffman, Newark, both of N.J.

[73] Assignee: Charles H. Kauffman, Newark, N.J.

[22] Filed: Apr. 27, 1973

[21] Appl. No.: 355,059

[52] U.S. Cl. .............. 23/259.1; 71/10; 209/3; 209/12; 241/46.17; 241/79.1
[51] Int. Cl. ....... C05f 9/02; B03b 7/00; B02c 18/40
[58] Field of Search ....... 23/259.1; 209/12, 20, 173; 100/117; 241/79.1, 46.17; 71/8, 9, 10, 14, 25

[56] References Cited
UNITED STATES PATENTS

| | | | |
|---|---|---|---|
| 1,548,971 | 8/1925 | Ziska, Jr. | 209/173 |
| 2,280,129 | 4/1942 | Reinders-Folmer | 23/259.1 X |
| 2,929,688 | 3/1960 | Riker et al. | 23/259.1 |
| 3,236,604 | 2/1966 | Pierson | 23/259.1 |
| 3,335,966 | 8/1967 | Haveman | 209/173 UX |
| 3,426,677 | 2/1969 | Combs et al. | 100/117 |
| 3,736,111 | 5/1973 | Gardner et al. | 23/259.1 X |
| 3,747,757 | 7/1973 | Kalthoff et al. | 209/211 X |
| 3,784,116 | 1/1974 | Buckman et al. | 241/46.17 |

FOREIGN PATENTS OR APPLICATIONS

| 201,264 | 3/1968 | U.S.S.R. | 209/168 |
|---|---|---|---|

Primary Examiner—Morris O. Wolk
Assistant Examiner—Roger F. Phillips
Attorney, Agent, or Firm—Harry B. Rook

[57] ABSTRACT

Municipal refuse including glass articles, metal cans, paper, plastics and wood, is dumped onto a conveyor and has magnetic materials removed therefrom and the remaining refuse conveyed to a hammermill which reduces the refuse into small particles which are conveyed by positive air pressure to the upper cyclonic separator chamber of a tank the lower chamber of which contains liquid on the surface of which the light weight floatable particles collect and the heavy solid particles such as glass and non-ferrous metals sink to the bottom of the tank, the slurry mixed with sewage sludge and reduced in a wet pulping apparatus into a homogenized mix which is compressed in a screw type dewatering device wherein about fifty percent of the moisture content is removed, providing material free of glass and of all types of metals, ready for composting, for example, in windrows on the ground in the out-door atmosphere.

3 Claims, 4 Drawing Figures

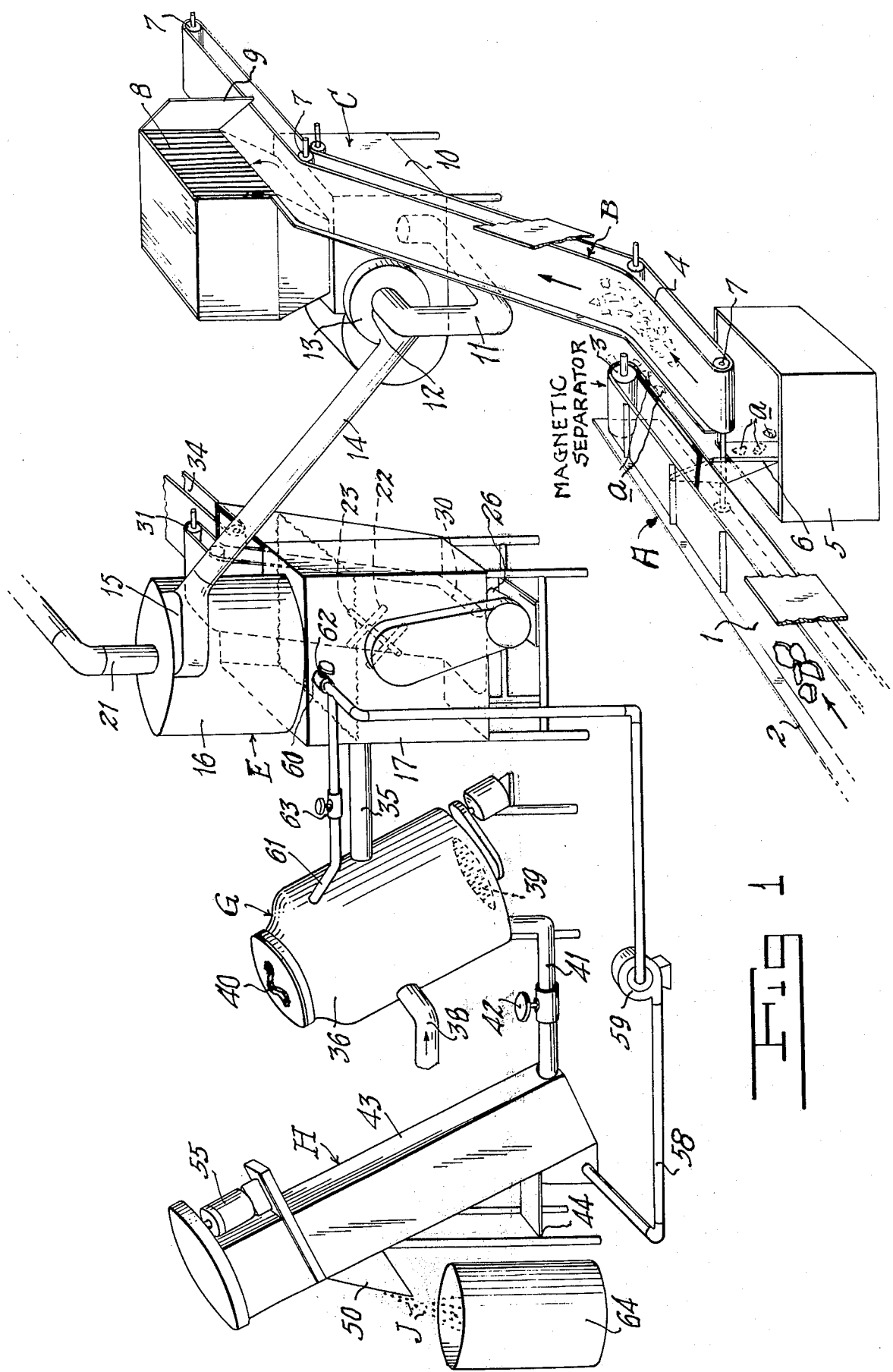

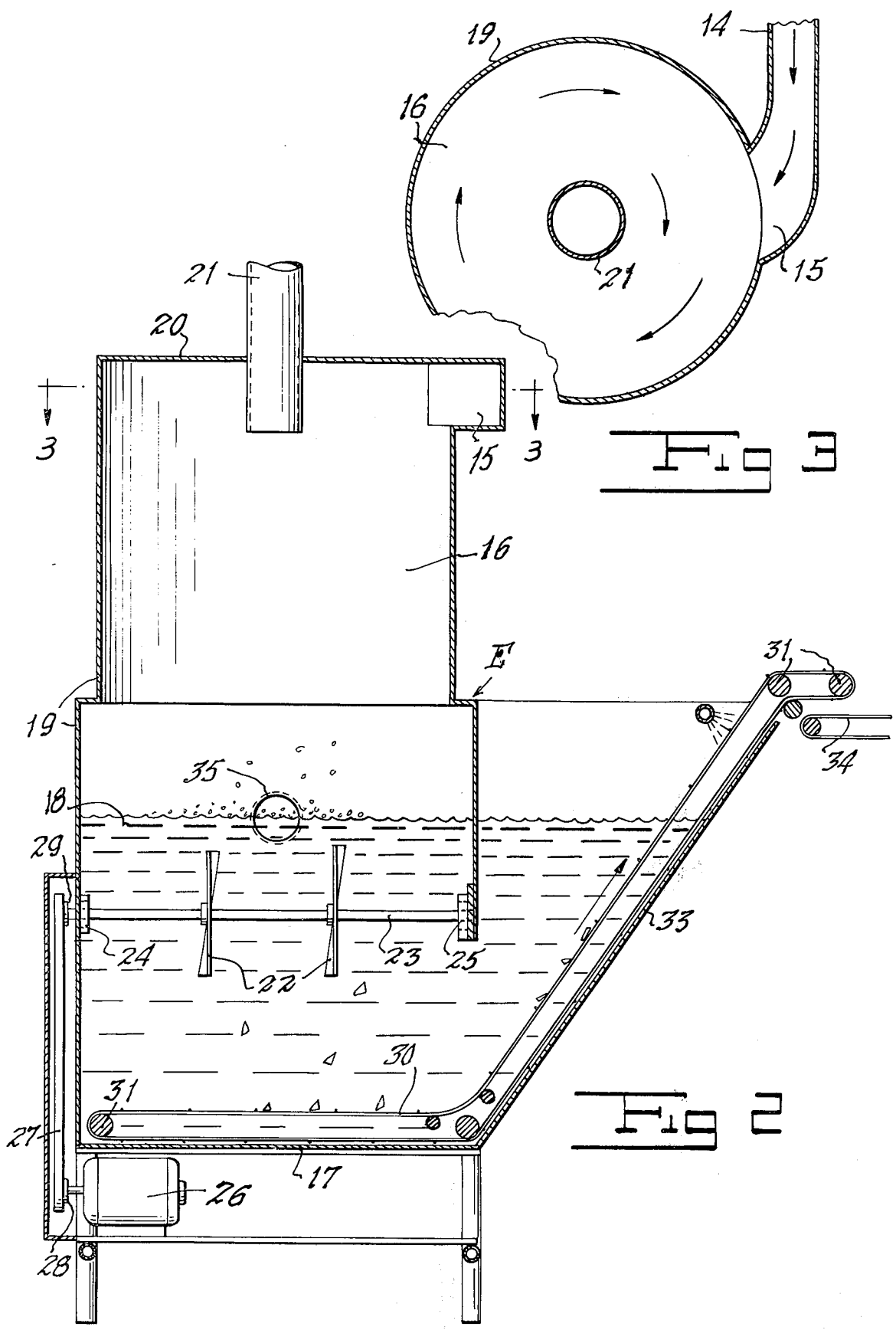

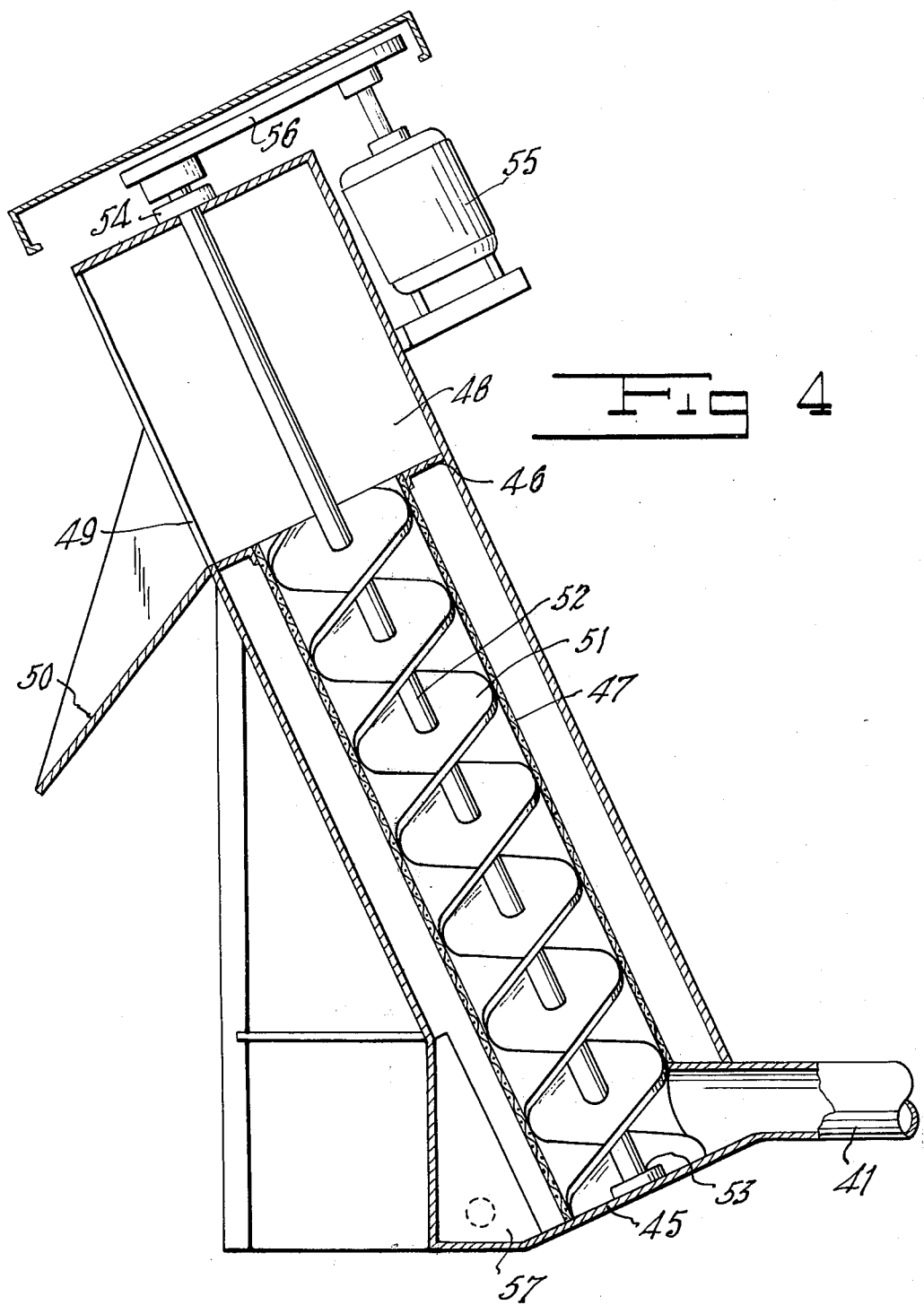

CONVERTING MUNICIPAL REFUSE INTO COMPOST

BACKGROUND OF THE INVENTION

This invention relates generally to the conversion of waste materials, for example, municipal refuse such as garbage, tin cans, glass, dinnerware, wood and sewage sludge, into compost, that is, into a finely-divided product suitable for use as a soil conditioner or fertilizer.

The prior art has proposed methods and apparatus wherein certain materials such as glass bottles, metal cans, paper plastics and wood are manually picked from the refuse, and the magnetic materials are removed by magnetic separators, after which the remaining stuff is ground or comminuted and classified in dry state to remove non-organic substances, after which the organic substances are treated in a composting apparatus.

Other methods and apparatus involve the forming of the unsegregated, uncomminuted refuse containing junk such as glass and metal articles into a windrow wherein the refuse is kept moistened and periodically tumbled for a period of for example 20 days to compost the garbage and paper products, after which the uncomposted junk is separated from the humus by screening.

In other methods, after the junk has been removed from the refuse, the remaining organic substances are disintegrated into the form of a wet pulp in a machine comprising a casing containing water and having at its lower end a rapidly rotating disk, carrying cutters, after which the pulp is dried for application to the earth as a soil conditioner.

These and other known methods and apparatus leave much to be desired in that either they require excessive amounts of time for performance, or are too costly, or involve special injections of extraneous substances to promote anaerobic bacterial action, or fail to accomplish adequate composting, for example because the end product contains too much glass and other inorganic materials, or noxious odors are produced.

SUMMARY OF THE INVENTION

One object of the present invention is to provide a method and apparatus for treating refuse which overcomes the objections to and disadvantages of the heretofore known methods and apparatus and which prepares the refuse for composting rapidly and relatively inexpensively, and which eliminates the picking or separate operations for removal of glass and non-ferrous materials, but wherein the glass and non-ferrous materials are practically completely removed, so that its end product is a clean, substantially odor-free compost.

The invention further provides a novel and improved method and apparatus for removing glass and other non-ferrous materials from the refuse, wherein the refuse including ferrous and other non-compostable materials is finely divided and then conveyed by positive air currents into a cyclonic air separator at the upper portion of a tank which may be termed a deglasser, above a body of liquid in the lower portion of the tank so that the finely-divided particles fall by gravity onto the body of liquid and the floatable particles float on the liquid surface while the other particles such as glass and non-ferrous metals sink by gravity to the bottom of the tank from where they are removed for recycling or discard or other uses, after which the floating particles are washed and further disintegrated or comminuted into a wet pulp which is later partially dried and composted, for example, in windrows on the ground in the outside atmosphere, which are periodically turned during a time cycle of, for example, 18 days, which is about 3 days less than the heretofore-known period or time cycle.

It is believed that the relatively short composting cycle can be attributed to increased aeration obtained at the deglasser and the practically complete removal of glass and other non-compostable substances.

BRIEF DESCRIPTION OF THE DRAWINGS

For a more complete understanding of the invention, reference should be had to the following description in conjunction with the accompanying drawings in which:

FIG. 1 is a schematic perspective view of apparatus embodying the invention for converting municipal refuse into compost, portions of the apparatus being broken away for clearness in illustration.

FIG. 2 is a greatly enlarged central vertical sectional view of the unit for removing glass particles and non-ferrous particles, which hereinafter may be called a glass and non-ferrous materials separator.

FIG. 3 is a horizontal sectional view, approximately on the plane of the line 3—3 FIG. 2.

FIG. 4 is an enlarged central vertical view of the screw-type dehydrator for partially drying the wet pulp mixture.

DESCRIPTION OF THE PREFERRED EMBODIMENT

Specifically describing the invention and with particular reference to FIG. 1, the apparatus includes means generally designated A for receiving the refuse and removing or separating ferrous materials therefrom. For the purpose of illustrating the principles involved, the means A comprises an endless conveyor belt 1 mounted in known manner on rollers mounted on a frame 2 one of which is a magnetic roller 3 disposed in partially overlapping relation to another conveyor B so as to discharge non-magnetic refuse from the conveyor belt 1 to the conveyor B and to discharge the magnetic or ferrous materials $a$ into a suitable bin 5. Desirably a deflector plate 6 is provided to dislodge from the belt any pieces of refuse that pass the magnetic separator roller 3.

The conveyor B includes an endless belt 4 mounted on rollers 7 journalled on frame 2 and the housing of a grinder C (such as a hammermill) which has a charging opening 8 into which the conveyor B feeds the refuse with the aid of a deflector plate 9. The grinder is of known construction and driven by suitable means (not shown) so as to reduce the refuse to finely divided particles which accumulate in the lower portion 10 of the housing from which the particles are drawn through a pipe 11 to the inlet 12 of centrifugal pump 13 whose outlet pipe 14 conducts the particles under positive air pressure at a speed of the order of 12,000 feet per minute into a tangential inlet 15 of the cylindrical cyclonic air separator chamber 16 of a deglasser and other non-ferrous materials remover E which includes a tank 17 containing a body of liquid 18 preferably water (see FIG. 2). The lower end of the chylindrical wall 19 of the cyclonic air separator chamber 16 extends into said body of liquid several inches below the surface thereof so that said surface serves as the bottom wall of the chamber. The top wall 20 of the chamber has an outlet pipe 21 extending coaxially into the chamber to a point below the air inlet 15.

In the chamber 16, the particles are subjected to a cyclonic action and are aerated, the air being exhausted to the atmosphere through outlet pipe 21. The particles fall by gravity into the liquid, the heavier particles such as glass and non-ferrous metals sinking to the bottom of the tank while the lighter particles are suspended in the liquid in the form of a slurry.

Mounted in the tank at the lower end of the chamber is suitable means for agitating the slurry to insure separation of the light and heavy particles. This means is shown as comprising paddles or vanes 22 carried by a horizontal shaft 23 which is journaled in bearings 24 and 25 in the tank wall and chamber wall, respectively, driven by an electric motor 26 through a belt 27 and pulleys 28 and 29 on the motor shaft and agitator shaft 23, respectively.

The heavy particles are removed from the tanks by any viable means which is schematically shown as one or more endless belt conveyors 30 mounted on rollers 31 journaled in the tank, at least one of which is driven by any suitable means (not shown). A portion of the conveyor is disposed at the bottom of the tank to receive the falling particles and another portion runs along an upwardly and outwardly inclined wall 33 of the tank and over the edge of said wall with upper end located above one end of a take-away conveyor 34, whereby the heavy particles are removed from the tank for any desired disposition.

The slurry minus the heavy particles flows through an outlet pipe 35 located preferably partially below and partially above the surface of the liquid as shown in FIG. 2, into pulping unit G of generally known construction including a tank 36 where the particles are further finely divided, and preferably mixed with sewage sludge admitted through a pipe 38, to produce a homogenized wet pulpy mixture containing about 90 percent liquid. The wet pulping apparatus generally includes the tank 36 at the lower end of which is a rapidly rotating disc 39, carrying cutters, for example, of the type commonly used in the reduction of wood into pulp in the paper making industry. The tank preferably has a removable cover 40.

The pulpy mixture flows through an outlet pipe 41 controlled by a valve 42 into a dehydrating apparatus H where the mixture is dehydrated into a mass having a moisture content of the order of 50 percent.

Preferably, and as best shown in FIG. 4, the dewatering apparatus H is of the screw type and includes a housing 43, supported by a frame 44 in an upstanding inclined position. The housing has bottom and intermediate transverse walls 45 and 46 respectively, between which is mounted coaxially with the housing a cylindrical screen 47 to whose lower end is connected the outlet pipe of the wet pulping unit G to receive the slurry therefrom. The upper end of the screen opens through the intermediate wall 46 into a discharge chamber 48 the outlet opening 49 of which has a discharge chute 50. Rotatable in the screen is a screw 51 mounted on a shaft 52 which is journaled in bearings 53 and 54 in the bottom wall and top wall of the housing, respectively, and is driven by a motor 55 mounted on the housing and having a driving connection 56 for example, chain and sprocket, with the outwardly extending end of the shaft 52. In operation of the apparatus, the rotating screw raises the mass of slurry from the inlet pipe 41 through the screen into the discharge chamber 48, at the same time squeezing the mass to express therefrom the water which collects in a well 57 at the bottom of the housing from where the water is withdrawn, preferably through a pipe 58 by a pump 59 and recirculated into the deglasser tank at 60 and into the wet pulping unit at 61 under control of the respective valves 62 and 63. The dehydrated mass J having the desired moisture content of, for example, 50 percent is ejected through the chute 50 into a suitable receptacle 64 as shown in FIG. 1, or onto a take-away conveyor (not shown).

The end product, the dehydrated mass J is free of glass and all types of metals and is ready for composting in any suitable manner but preferably by piling the material in windrows on the ground in the outside atmosphere and turning the windrows periodically, preferably every 3 days, during a time cycle of the order of 18 days. Between each turning operation the material at the interiors of the windrows is permitted to develop a temperature of the order of 160° to 170° F. At the end of this period the material is clean and free of objectionable odors.

It is believed that the relatively short composting period, as compared with known methods, can be attributed to increased aeration produced at the deglasser and to the clean content of the dehydrated material substantially free of glass, metals and non-compostable substances.

I claim:

1. Apparatus for converting municipal refuse into compost comprising:

a separator means for removing ferrous materials from the refuse, grinding means for reducing the refuse to finely divided particles, means for conveying to said grinding means from said separator means the refuse thus freed of ferrous materials, means for separating glass particles and particles of other non-ferrous materials, said means comprising a tank containing a body of liquid, and cyclonic air separator chamber having a cylindrical wall mounted on said tank above said body of liquid with the lower end of said wall extending downwardly into said body of liquid below the surface thereof so that the surface of the liquid forms the bottom wall of the chamber, said chamber including a top wall having an outlet pipe extending into the chamber, said chamber also having a tangential air inlet above the lower end of said outlet pipe, means including a power driven centrifugal air pump having its inlet communicating with said grinding means and its outlet connected to said tangential air inlet of said cyclonic air separator chamber for conveying the particles from the grinding means to the cyclonic separator chamber under positive air pressure whereby the particles are aerated and fall by gravity on the surface of the liquid and the heavier particles sink in the body of liquid while the lighter particles are suspended in the liquid in form of a slurry, means for agitating the slurry, means for removing the heavier particles from the slurry at the bottom of said tank, a wet pulping apparatus, means for removing the slurry from the tank adjacent the surface of the slurry and conveying said slurry to said wet pulping apparatus in a mixture containing about ninety percent liquid which further finely divides and washes the particles and produces a homogenized wet pulpy mixture devoid of glass particles and other heavier non-ferrous particles, a drier for dehydrating said pulpy mixture into a dehydrated mass having a moisture content of the order of 50 percent, and means for conveying said wet pulpy mixture from said wet pulping apparatus to said drier.

2. Apparatus for converting municipal refuse into compost comprising:

a separator means for removing ferrous materials from the refuse, grinding means for reducing the refuse to finely divided particles, means for conveying to said grinding means from said separator means the refuse thus freed of ferrous materials, means for separating glass particles and particles of other non-ferrous materials, said means comprising a tank containing a body of liquid, and a cyclonic air separator chamber having a cylindrical wall mounted on said tank above said body of liquid, said chamber including a top wall having an outlet pipe extending into the chamber, said chamber also having a tangential air inlet above the lower end of said outlet pipe, means including an air pump to convey the particles from the grinding means to the cyclonic air separator under positive air pressure whereby the particles are aerated and fall by gravity into the liquid in the tank and the heavier particles sink to the bottom of the tank, means for removing the heavier particles from the bottom of the tank, a wet pulping apparatus, means for removing the slurry from the tank adjacent the surface of the slurry and conveying said slurry to said wet pulping apparatus in a mixture containing about ninety percent liquid which further finely divides and washes the particles and produces a homogenized wet pulpy mixture devoid of glass particles and other heavier non-ferrous particles, a drier for dehydrating said pulpy mixture into a dehydrated mass having a moisture content of the order of 50 percent, and means for conveying said wet pulpy mixture from said wet pulping apparatus to said drier.

3. Apparatus as defined in claim 1 wherein said drier comprises a housing supported in an upstanding inclined position and having a bottom wall, an intermediate wall and a top wall, a cylindrical screen mounted between said bottom wall and said intermediate wall, a power driven screw rotatable in said screen and journaled in said bottom wall and said intermediate wall, said outlet of the wet pulper being connected to the lower end of said screen and the upper end of the screen opening through said intermediate wall whereby the slurry is elevated and compressed by the screw to squeeze water therefrom which water accumulates at the bottom of said housing, and means for pumping said water to said tank of the means for separating glass from the refuse and to said wet pulping apparatus.

* * * * *